Dec. 14, 1926.

H. L. JOHNSTON ET AL 1,611,042

VARIABLE SPEED MECHANISM

Filed August 24, 1925    2 Sheets-Sheet 1

Herbert L. Johnston  Milton K. Akers
INVENTOR.

BY

Allen & Allen
ATTORNEY.

Dec. 14, 1926.  1,611,042
H. L. JOHNSTON ET AL
VARIABLE SPEED MECHANISM
Filed August 24, 1925   2 Sheets-Sheet 2
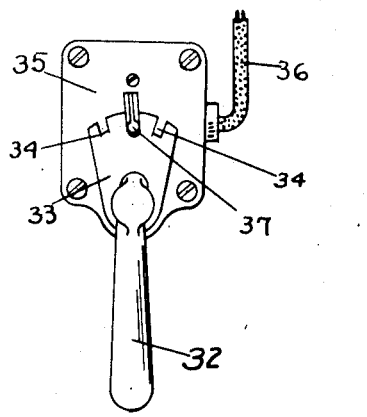
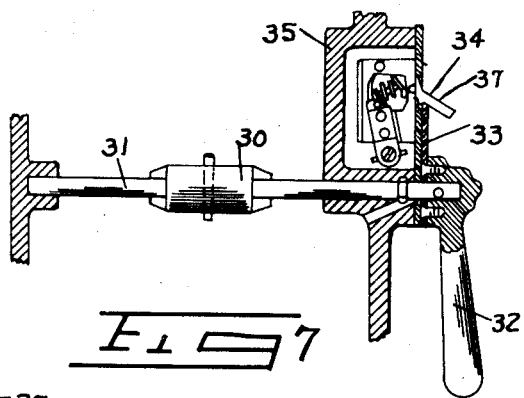
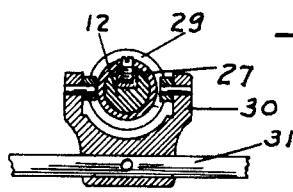
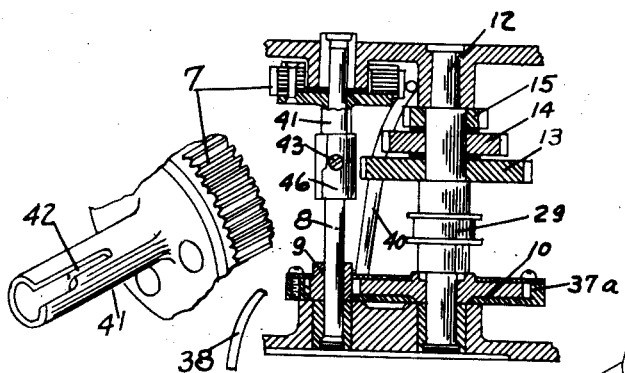
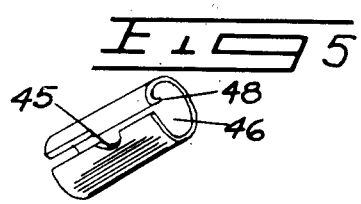
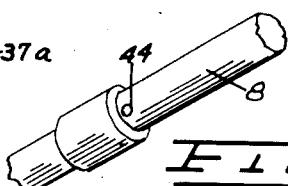
Herbert L Johnston Milton K Akers
INVENTOR.
BY
Allen & Allen
ATTORNEY.

Patented Dec. 14, 1926.

1,611,042

UNITED STATES PATENT OFFICE.

HERBERT L. JOHNSTON AND MILTON K. AKERS, OF TROY, OHIO, ASSIGNORS TO THE HOBART MANUFACTURING COMPANY, OF TROY, OHIO, A CORPORATION OF OHIO.

VARIABLE-SPEED MECHANISM.

Application filed August 24, 1925. Serial No. 52,079½.

Our machine relates to that type of gearing mechanism as adaptable for use in cake mixing machines and the like, which are usually driven by electric motors and are provided with change of speed mechanism for varying the speed of the agitators of the mixers. It is the object of our invention to provide various features of novelty to be hereafter particularly pointed out and claimed, whereby the operation of the various parts of the driving mechanism will be safeguarded and rendered more effective and convenient.

It is one of our objects to provide a simple and effective arrangement for interlocking the gear speed change devices for changing the speed with the switch control for the motor, whereby the current for the motor cannot be turned on until the gear shifting devices are in proper position, nor the gears shifted from one position to another while the current is on and the motor in operation.

Another feature of novelty relates to the system of lubrication, whereby the oil is lifted from the bottom of the case and discharged over the gearing to run back to the bottom and to be repumped so as to maintain a continuous circulation of lubricant and in which system two of the driving train of gears may be utilized as a gear pump.

A third feature relates to the construction employed for coupling the driving shaft to the driven shaft to absorb the shocks incident to the sudden starting of the machine and also to the manner of securing a planetary element to the driving shaft, so that the connection can be broken without other damage to the mechanism in the event of a sudden stoppage of the beater from any outside source.

In the drawings,

Figure 2 is a detail elevation of the transmission gears, partly in section.

Figure 3 is a perspective view of the main driving gear for the main driving shaft.

Figures 4 and 5 are perspective views of the coupling pieces for the driving shaft.

Figure 6 is a front elevation of the interlocking device for the change of speed mechanism.

Figure 7 is a longitudinal section of the same.

Figure 8 is a cross section of the shifting device.

Figure 1:
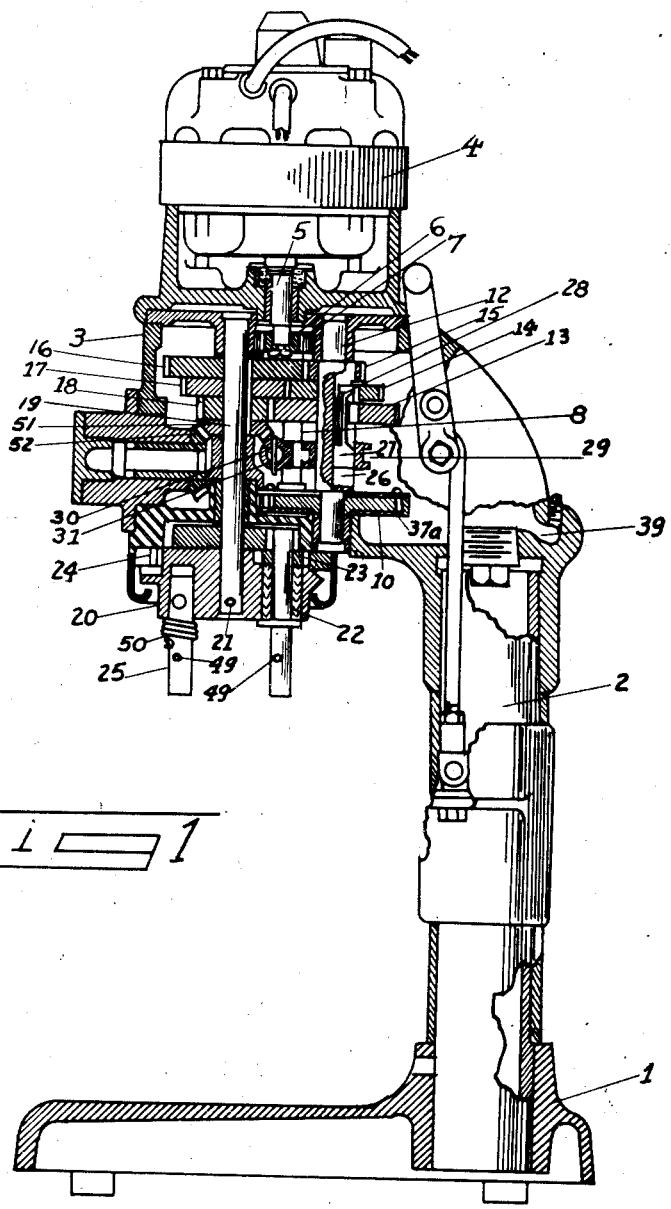
Figure 1 is a central vertical section of the mechanism mounted on a convenient base.

The mechanism is shown as mounted on a substantial base 1 carrying a pedestal 2 and gear case 3, these parts together providing a substantial framework for the working parts.

Mounted on top of the gear case is the electric motor 4 with its motor shaft 5 projecting downwardly and carrying a pinion 6. This pinion meshes with a driving gear 7 mounted on the driving shaft 8 of the machine mounted vertically in suitable bearings in the gear case. The lower end of the shaft carries the pinion 9, which meshes with the gear 10 keyed to the lower end of a countershaft 12, which carries loosely mounted thereon three gears of different diameters 13, 14 and 15. The construction for selectively coupling any one of these gears to the countershaft for varying the speed will be later described.

The three gears 13, 14 and 15 mesh with a corresponding set of gears 16, 17 and 18 keyed to the shaft 19, which as shown may be utilized at its lower end, the planetary head 20, to which it may be secured by a pin 21. The pin 21 is of such a size that when any excessive strain is thrown on the shaft, the pin will be sheared off to free the planetary head and relieve the motor and transmission mechanism from undue and dangerous strains and consequent damage.

Mounted in the planetary head a suitable distance from the shaft 19 and parallel thereto is a shaft 22, to which any desired agitator can be attached. In order that this shaft shall be rotated on its own axis, the shaft carries a pinion 23, which meshes with an internal gear on the ring or band 24 secured to the gear casing. In this way the usual planetary movement is imparted to the shaft or an agitator mounted on it. When a mere rotary movement without rotation on its axis is desired, we provide a shaft 25 secured in fixed position in the planetary head, to which any desired non-rotative agitator may be secured.

In order to vary the speed of the planetary head we provide for selectively coupling the gears 13, 14 and 15 to the countershaft 12 by means of a key-way 26 and sliding key 27 provided with a projection 28 to engage in a key-way in the bearing face of the gear selected.

The key 27 is attached to the grooved collar 29, mounted to slide on the shaft 12 and actuated by the yoke 30 pinned on the rod or shaft 31, which is adapted to be rocked by the handle 32.

Attached to this handle is a segmental plate 33 provided with a series of notches 34. This plate extends up in front of the switch box 35, through which the current to the motor is furnished through the wires 36, 36ª. The current is controlled by the switch lever 37 which projects out through the box and is depressed to throw on the current and raised to cut it off. This lever must therefore enter one of the notches on the plate 33 before current can be supplied to the motor and therefore the gear shifting handle must be moved into such position that one of the gears in the speed train will be properly connected before the motor can be started. The switch lever when seated in one of the notches 34 also blocks the handle from movement to another position while the current is on, so that it is impossible to change the speed except when the current is turned off.

To provide a simple and effective system of lubrication we utilize the gears 9 and 10 for the gear pump. These gears are enclosed in a casing 37ª to form the pump casing, and a tube 38 connects one side of the casing with the oil supply in the bottom of the transmission casing. On the delivery side of the gear pump casing the oil is raised through the pipe 40 and discharged over the transmission gears in the upper part of the casing. The oil from this point runs down over the gear mechanism and is distributed throughout the casing, finally collecting in the bottom 39, whence it is again pumped through the system.

In order to provide a shock absorber to avoid shocks from the sudden starting of the motor, we provide a limited yielding connection between the motor and driving shaft.

The gear 7 is formed with an elongated hub 41 provided with an axial slot 42. The shaft 8, upon which the gear 7 is mounted, carries a stud screw 43 secured in the hole 44 in the shaft, which stud projects through the slot 42 in the hub of the gear, and this stud also engages in the notch 45 provided in a split sleeve 46, which is slipped over the hub and is provided with a turned-in portion 48 which engages in the slot 42.

In this way the gear 7 is secured to the shaft 8. Any sudden starting of the motor throws a heavy torsional strain between the gear 7 and the shaft 8 and under this strain the split sleeve, which is of resilient material, will open out, within the limits of play of stud 43, and act as a cushion to absorb the shock.

For securing the various styles of agitators to be used in the end of the shafts we prefer a bayonet lock construction in which the agitator is provided with a socket to fit closely over the end of the shaft. The socket may be provided with an L-shaped slot terminating in a notch which is engaged by a pin 49 on the shaft, while to maintain the engagement and to prevent the beater from becoming accidentally disengaged, we provide a coiled spring as indicated at 50 interposed between the socket of the beater and a washer on the shaft.

In order to utilize the mechanism for machines, such as grinders, choppers, and the like, the main vertical shaft is provided in the gear casing with the beveled gear 51 meshing with a corresponding beveled gear 52 on a horizontal shaft, which may have its bearing in a housing where provision is made for coupling the driving shaft of the attachment.

The operation of the mechanism will be obvious from the foregoing description. It will be understood, of course, that in the description of details of mechanism we have only shown our preferred form, that we do not wish to be limited to exact details and that our failure to point out equivalent mechanism is not to be understood as a waiver of the doctrine of equivalents to the extent to which we may be entitled to invoke that doctrine.

Having thus described our invention, what we claim as new and desire to secure by Letters Patent, is:—

1. In an electrically driven gear mechanism, the combination with change of speed mechanism and a lever for operating the same, of a switch for controlling the current to the motor, and interlocking mechanism intermediate the lever and the switch to prevent the operation of either lever or switch except in certain predetermined positions.

2. In an electrically driven gear mechanism, the combination with change of speed mechanism and a lever for operating the same, of a switch for controlling the current to the motor, an interlocking plate attached to one operating member and adapted to engage the other to prevent operation of either member except in certain predetermined positions.

3. In an electrically driven gear mechanism, the combination with change of speed mechanism and a lever for operating the same, of a switch for controlling the current to the motor, an interlocking plate attached to the operating lever, shaped to prevent the operation of the switch to turn on the current except in certain predetermined positions.

4. In an electrically driven gear mechanism, the combination with change of speed mechanism and a lever for operating the same, of a switch for controlling the current to the motor, an interlocking plate attached to the operating lever, with slots in the plate to receive the switch and permit its operation when the plate is in certain predetermined positions and to lock the plate when the switch is in engagement with the slots.

HERBERT L. JOHNSTON.
MILTON K. AKERS.